United States Patent
Someya et al.

(10) Patent No.: US 10,038,509 B2
(45) Date of Patent: Jul. 31, 2018

(54) DATA RECEPTION APPARATUS, DATA TRANSMISSION SYSTEM, DATA RECEPTION METHOD, AND DATA TRANSMISSION METHOD

(71) Applicant: SONY CORPORATION, Tokyo (JP)

(72) Inventors: Takahisa Someya, Kanagawa (JP); Kensaku Wakuda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/554,913

(22) PCT Filed: Mar. 11, 2016

(86) PCT No.: PCT/JP2016/001364
§ 371 (c)(1),
(2) Date: Aug. 31, 2017

(87) PCT Pub. No.: WO2016/152063
PCT Pub. Date: Sep. 29, 2016

(65) Prior Publication Data
US 2018/0048407 A1    Feb. 15, 2018

(30) Foreign Application Priority Data
Mar. 24, 2015    (JP) .................. 2015-061393

(51) Int. Cl.
*H04H 20/04*    (2008.01)
*H04L 1/18*    (2006.01)

(52) U.S. Cl.
CPC .......... *H04H 20/04* (2013.01); *H04L 1/1835* (2013.01); *H04L 1/18* (2013.01)

(58) Field of Classification Search
CPC ...................................... H04H 20/04
(Continued)

(56) References Cited

U.S. PATENT DOCUMENTS

| | | | |
|---|---|---|---|
| 5,694,404 A | * | 12/1997 | Huang ............... G06F 5/14 714/751 |
| 2008/0046924 A1 | | 2/2008 | Hood |
| 2009/0232135 A1 | | 9/2009 | Terui et al. |

FOREIGN PATENT DOCUMENTS

| | | |
|---|---|---|
| JP | 2002-262286 A | 9/2002 |
| JP | 2004-159042 A | 6/2004 |

(Continued)

OTHER PUBLICATIONS

International Search Report dated May 17, 2016 in PCT/JP2016/001364.

(Continued)

*Primary Examiner* — Keith Ferguson
(74) *Attorney, Agent, or Firm* — Oblon, McClelland, Maier & Neustadt, L.L.P.

(57) ABSTRACT

This data reception apparatus includes a first buffer capable of retaining a received packet at least in units of error correction blocks and a first controller that requests a transmission apparatus to retransmit a lost packet in the error correction block retained in the first buffer and performs processing of recovering the lost packet, and reads, from the first buffer, the error correction block at a point of time at which each of a plurality of particular data correction-allowed times different from each other elapses, performs error correction on each error correction block read at each point of time, and outputs each error correction result.

11 Claims, 9 Drawing Sheets

(58) Field of Classification Search
USPC ....... 455/3.06, 3.05–3.05, 412.1, 412.2, 500, 455/517, 426.1, 426.2; 1/1; 714/748, 714/757, E11.001
See application file for complete search history.

(56) References Cited

FOREIGN PATENT DOCUMENTS

| JP | 2009-225025 A | 10/2009 |
|----|---------------|---------|
| JP | 2009-545063 A | 12/2009 |

OTHER PUBLICATIONS

Shuhci Oda, et al., "Development of Video Transmission System pursuing Available Network Bandwidth", The Institute of Electronics, Information and Communication Engineers, 2008, pp. 85-90 (with English abstract).

* cited by examiner

DATA RECEPTION APPARATUS, DATA TRANSMISSION SYSTEM, DATA RECEPTION METHOD, AND DATA TRANSMISSION METHOD

TECHNICAL FIELD

The present technology relates to a data reception apparatus having a QoS function, a data transmission system, a data reception method, and a data transmission method.

BACKGROUND ART

During communication, packet loss associated with lowering of the network quality causes defects such as deterioration and freeze of video and disturbance of audio. Therefore, there is a need for quality control (QoS: Quality of Service) by which the quality of video and audio transmitted via a network is kept high. The QoS mechanism includes, for example, a packet retransmission function (ARQ: Automatic Repeat reQuest) and a forward error correction function (FEC: Forward Error Correction).

For example, Patent Literature 1 describes a technology called hybrid ARQ combining the ARQ with the FEC. In this technology, only packets, which were not able to be restored by the FEC, are retransmitted by the ARQ.

CITATION LIST

Patent Literature

Patent Literature 1: Japanese Patent Application Laid-open No. 2004-159042

DISCLOSURE OF INVENTION

Technical Problem

However, there are still many problems to be improved in data communication using the QoS, which employs on the ARQ, the FEC, and the like, and applications thereof.

In view of the above-mentioned circumstances, it is an object of the present technology to solve various problems of the data communication using the QoS and the applications thereof.

Solution to Problem

In order to solve the above-mentioned problems, a data reception apparatus according to the present technology includes
a first buffer capable of retaining a received packet at least in units of error correction blocks; and
a first controller that
requests a transmission source to retransmit a lost packet in the error correction block retained in the first buffer and performs processing of recovering the lost packet, and
reads, from the first buffer, the error correction block at each point of time at which each of a plurality of particular data correction-allowed times different from each other elapses, performs error correction on each error correction block read at each point of time, and outputs each error correction result.

Each point of time at which each of the plurality of particular data correction-allowed times different from each other elapses may be a first point of time at which a particular first data correction-allowed time elapses and a second point of time at which a particular second data correction-allowed time shorter than the first data correction-allowed time elapses, and
the first controller may be configured to output an error correction result with respect to the error correction block read at the first point of time as first error correction data and output an error correction result with respect to the error correction block read at the second point of time as second error correction data.

The packet may include video and audio data, and
the data reception apparatus may further include:
a first output interface for outputting the first error correction data as data to be broadcast; and
a second output interface for outputting the second error correction data to a studio monitor and a studio speaker of a broadcast station.

The packet may include video and audio data, and
the data reception apparatus may further include:
a first output interface for outputting the first error correction data to a recording device of a broadcast station; and
a second output interface for outputting the second error correction data to a recording monitor and a recording speaker of the broadcast station.

The first controller may be configured to dynamically change, during reception of a stream from the transmission apparatus, the first data correction-allowed time on the basis of a command from an external control device.

A data transmission system according to the present technology includes:
a data reception apparatus including
a first buffer capable of retaining a received packet at least in units of error correction blocks, and
a first controller that
requests a transmission apparatus to retransmit a lost packet in the error correction block retained in the first buffer and performs processing of recovering the lost packet, and
reads, from the first buffer, the error correction block at a point of time at which each of a plurality of particular data correction-allowed times different from each other elapses, performs error correction on each error correction block read at each point of time, and outputs each error correction result;
a data transmission apparatus including a second buffer capable of retaining a packet to send, at least in units of error correction blocks; and
a control device including a second controller that sets a longest data correction-allowed time of the plurality of data correction-allowed times and sets a retention time in which the error correction block is retained by the second buffer to the longest data correction-allowed time.

In the data transmission system according to the present technology,
the second controller may be configured to control the longest data correction-allowed time on the basis of at least either one of an error rate and a transmission delay.

The control device may further include a user interface that receives input from a user for setting the longest data correction-allowed time.

The user interface may receive input from a user for setting the longest data correction-allowed time to another data correction-allowed time.

A data reception method according to the present technology includes:

by a first controller requesting a transmission apparatus to retransmit a lost packet in an error correction block retained in a first buffer and performing processing of recovering the lost packet, the first buffer being capable of retaining a received packet at least in units of error correction blocks;

reading, from the first buffer, the error correction block at a point of time at which each of a plurality of particular data correction-allowed times different from each other elapses; and performing error correction on each error correction block read at each point of time and outputting each error correction result.

A data transmission method according to the present technology includes:

by a second controller of a control device setting a longest data correction-allowed time of a plurality of particular data correction-allowed times different from each other in a data reception apparatus that requests a transmission apparatus to retransmit a lost packet in an error correction block retained in a first buffer capable of retaining a received packet at least in units of error correction blocks and performs processing of recovering the lost packet, and reads, from the first buffer, the error correction block at a point of time at which each of the plurality of data correction-allowed times different from each other elapses, performs error correction on each error correction block read at each point of time, and outputs each error correction result; and setting, to the longest data correction-allowed time, a retention time of the error correction block in which the error correction block is retained by a second buffer of a data transmission apparatus whose connection with the data reception apparatus is established, the second buffer retaining a transmission packet.

Advantageous Effects of Invention

As described above, in accordance with the present technology, it is possible to solve various problems of the data communication using the QoS and the applications thereof.

It should be noted that the effects described here are not necessarily limitative and may be any effect described in the present disclosure.

MODE(S) FOR CARRYING OUT THE INVENTION

Hereinafter, embodiments according to the present technology will be described with reference to the drawings.

First Embodiment

Figure 1:
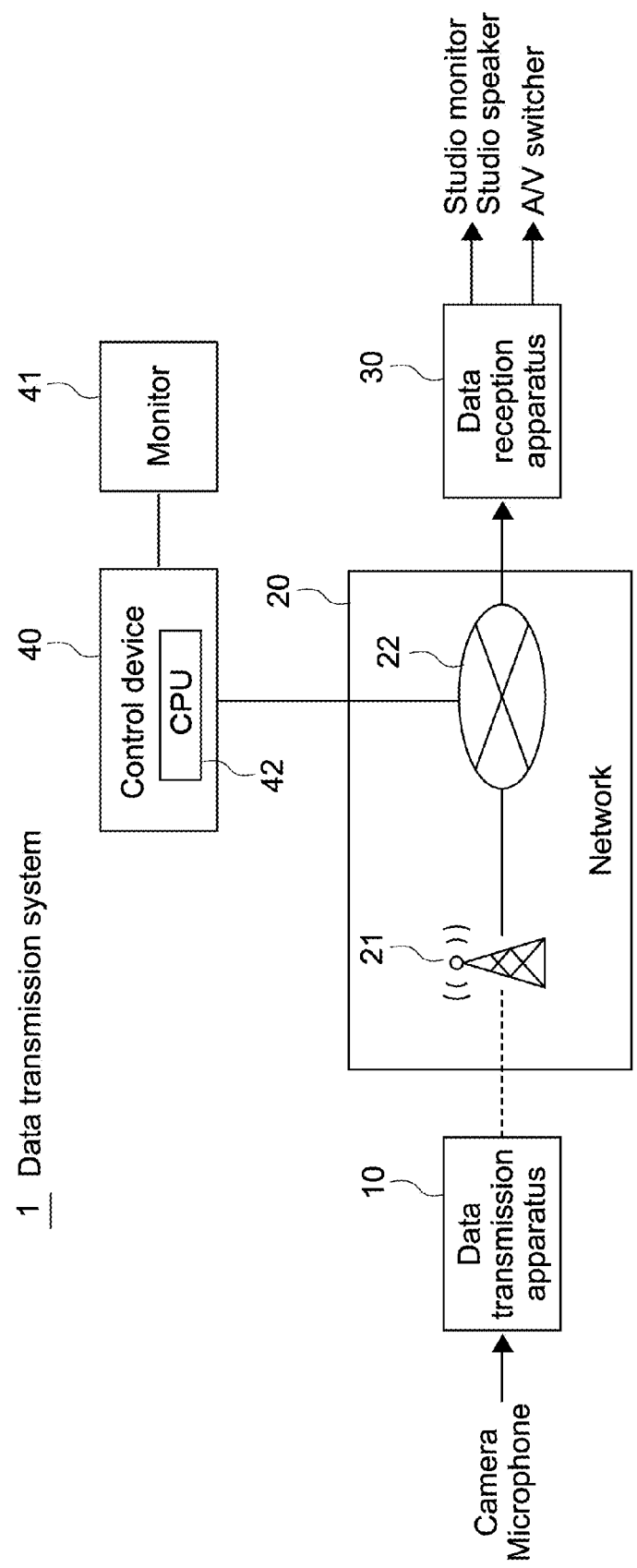
[FIG. 1] A diagram showing a configuration of a data transmission system of a first embodiment according to the present technology.

FIG. 1 is a diagram showing a configuration of a data transmission system of a first embodiment according to the present technology.

This data transmission system 1 is a system that transmits video and audio data (streams) obtained by a camera and a microphone. This data transmission system 1 is constituted of a data transmission apparatus 10, a network 20, a data reception apparatus 30, and a control device 40.

For example, the network 20 is a WWAN (Wireless Wide Area Network) 21 such as an LTE (Long Term Evolution), a WAN 22 such as the Internet, or a combination of a plurality of such networks 20 and is a communication channel whose communication traffic changes every minute.

The data transmission apparatus 10 may be in the form of an adaptor detachably mounted on the camera, for example, or may be integrally incorporated in the camera. In this embodiment, the data transmission apparatus 10 in the form of the adaptor is assumed.

The data reception apparatus 30 is an apparatus that receives video and audio data sent from the data transmission apparatus 10 and outputs it to a studio monitor and a studio speaker and outputs it to a recording device such as a broadcasting processing unit and a video server through a switcher and the like.

The control device 40 performs connection management between the data transmission apparatus 10 and the data reception apparatus 30. The control device 40 is connected to the data transmission apparatus 10 and the data reception apparatus 30 through the network 20, for example.

[Hardware Configuration of Data Transmission Apparatus 10]

Figure 2:
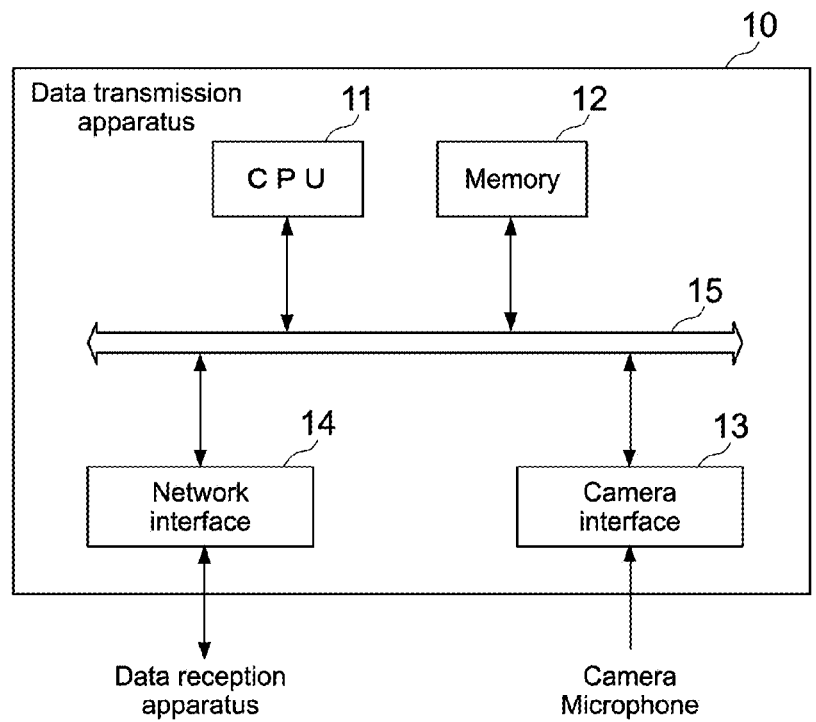
[FIG. 2] A diagram showing a hardware configuration of a data transmission apparatus 10 of FIG. 1.

FIG. 2 is a diagram showing a hardware configuration of the data transmission apparatus 10.

The data transmission apparatus 10 includes hardware components such as a CPU (Central Processing Unit) 11, a memory 12, a camera interface 13, a network interface 14, and a bus 15.

The CPU 11 performs control and various types of arithmetic processing on the data transmission apparatus 10 on the basis of programs stored in the memory 12.

Programs and the like executed by the CPU 11 are stored in the memory 12. Further, a region such as a transmission buffer for retaining packets to send, which are generated from video and audio transmitted from the camera and the microphone through the camera interface 13, is allocated to the memory 12.

The camera interface 13 is an interface mainly for inputting video and audio output from the camera and the microphone.

The network interface 14 is a network interface compatible mainly with the WWAN. It should be noted that the network interface 14 may be a network interface compatible with the WAN.

[Hardware Configuration of Data Reception Apparatus 30]

Figure 3:
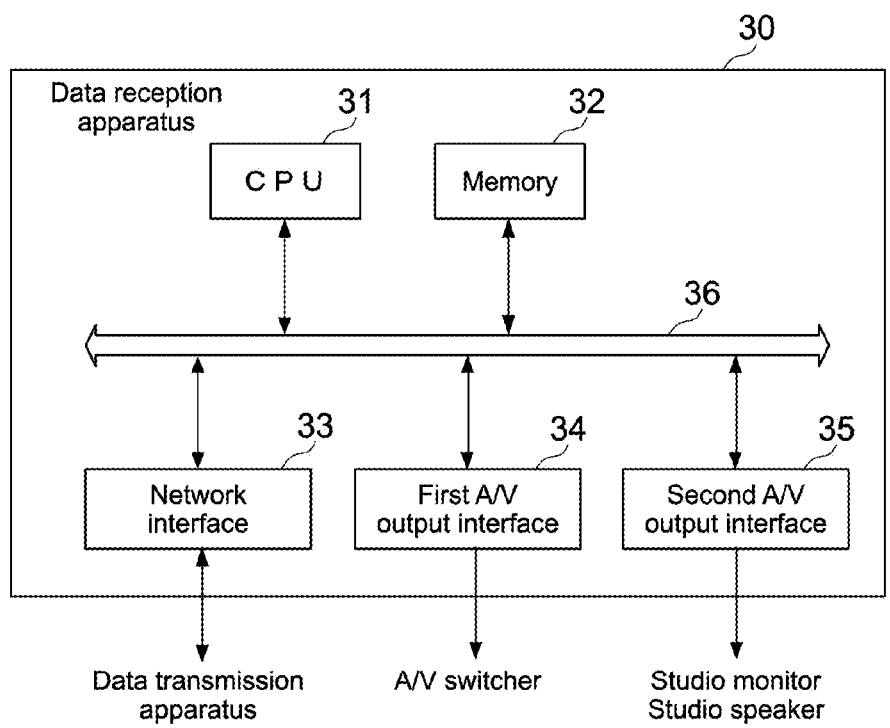
[FIG. 3] A diagram showing a hardware configuration of a data reception apparatus 30 of FIG. 1.

FIG. 3 is a diagram showing a hardware configuration of the data reception apparatus 30.

The data reception apparatus 30 includes, for example, hardware components such as a CPU 31 (first controller), a memory 32, a network interface 33, a first A/V output interface 34, a second A/V output interface 35, and a bus 36.

The CPU 31 controls operations of the data transmission apparatus 10 on the basis of programs stored in the memory 32.

Programs and the like executed by the CPU 31 are stored in the memory 32. Further, a region such as an A/V stream construction buffer that retains data transmitted from the data transmission apparatus 10 through the network interface 33 is allocated to the memory 32.

The network interface 33 is a network interface 33 compatible mainly with the WAN. It should be noted that it does not necessarily need to be compatible mainly with the WAN and may be a network interface compatible with the WWAN.

The first A/V output interface 34 outputs video and audio data received by the data reception apparatus 30 to a studio device such as an A/V switcher. The first A/V output interface 34 is, for example, an SDI (Serial Digital Interface).

The second A/V output interface 34 outputs video and audio baseband data received by the data reception apparatus 30 to a studio device such as the studio monitor and the studio speaker.

[Configuration of QoS Function]

Next, a QoS (Quality of Service) function of this data transmission system 1 will be described.

Figure 4:
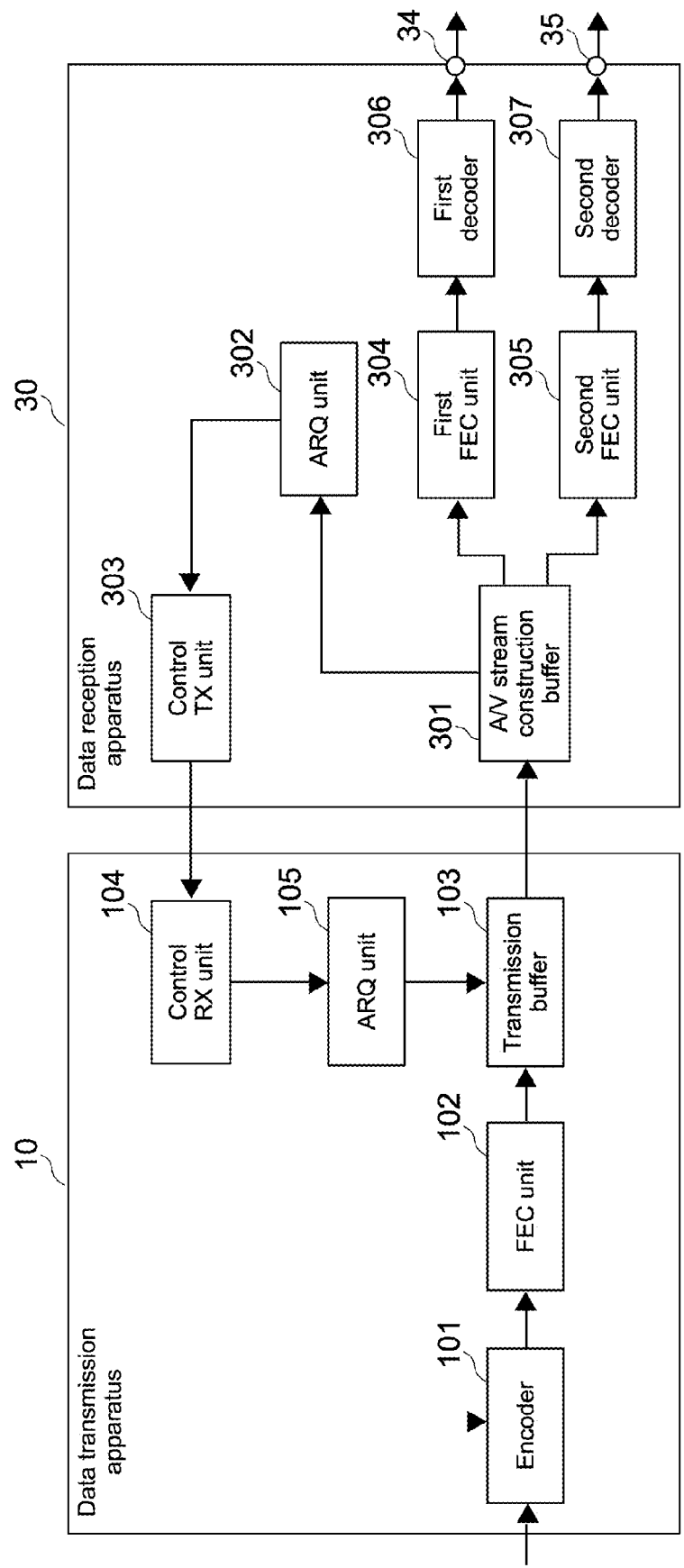
[FIG. 4] A diagram showing a configuration of a QoS function in a data transmission system 1 of FIG. 1.

FIG. 4 is a diagram showing a configuration of the QoS function in the data transmission system 1 of this embodiment.

Note that, regarding the blocks within the data transmission apparatus 10 and the blocks within the data reception apparatus 30 which are shown in FIG. 4, those other than the buffer are functions realized by the CPU 31 executing programs stored in the memory 32. It should be noted that some functions having a larger amount of calculation, such as an encoder, a decoder, and an FEC, may be implemented in the form of hardware.

[QoS Function of Data Transmission Apparatus 10]

The QoS function of the data transmission apparatus 10 is mainly constituted of an encoder 101, an FEC unit 102, a transmission buffer 103 (second buffer), a control RX unit 104, and an ARQ unit 105.

The encoder 101 encodes video captured by the camera and audio obtained by the microphone or the like installed in the camera, for example, and supplies them to the FEC unit 102.

The FEC (Forward Error Correction) unit 102 generates an FEC block by adding an error correction code to a code sequence of video and audio supplied from the encoder 101, divides this FEC block into a predetermined size to generate a plurality of packets, and outputs each of the generated packets to the transmission buffer 103.

The transmission buffer 103 retains transmission packets for at least one block, preparing for a packet retransmission request from the reception apparatus (ARQ unit 302) and sends the retained transmission packets to the network 20 through the network interface 33.

The control RX unit 104 performs processing for receiving and sending various requests from/to a control TX unit of the data reception apparatus 30. For example, the control RX unit 104 receives a packet retransmission request from the data reception apparatus 30 and sends it to the ARQ unit 105.

The ARQ unit 105 instructs the transmission buffer 103 to retransmit corresponding transmission packets in response to the packet retransmission request sent from the control RX unit 104.

[QoS Function of Data Reception Apparatus 30]

The QoS function of the data reception apparatus 30 is mainly constituted of an A/V stream construction buffer 301 (first buffer), an ARQ unit 302, a control TX unit 303, a first FEC unit 304, a second FEC unit 305, a first decoder 306, and a second decoder 307.

The A/V stream construction buffer 301 retains a received packet in units of FEC blocks and reads it at a point of time at which the error correction-allowed time elapses.

In the QoS function of this embodiment, two error correction-allowed times are set. One of them is a first error correction-allowed time considering the QoS as important. The first error correction-allowed time is a time determined such that a high packet loss recovery rate with the ARQ and the FEC can be obtained by packet retransmission being repeated an increased number of times. The other is a second error correction-allowed time considering delay-time reduction as important. More specifically, the second error correction-allowed time is a time determined to provide quality appropriate for video and audio presented to a studio staff for talking between a spot and a studio. A length relationship therebetween is the first error correction-allowed time>the second error correction-allowed time.

Left in the A/V stream construction buffer 301, the FEC block retained in the A/V stream construction buffer 301 is read by the second FEC unit 305 at a point of time (second point of time) at which a retention time reaches the second error correction-allowed time. Subsequently, it is read by the first FEC unit 304 and removed from the A/V stream construction buffer 301 at a point of time (first point of time) at which the retention time reaches the first error correction-allowed time.

Note that the retention time of the transmission buffer 103 of the data transmission apparatus 10 is set by the external control device 40 in a manner that depends on the first error correction-allowed time.

Using the fact that the retention time elapses the first error correction-allowed time as a trigger, the first FEC unit 304 performs error correction on the FEC block read from the A/V stream construction buffer 301 and outputs the result to the first decoder 306.

The first decoder 306 decodes the result of the error correction obtained by the first FEC unit 304. The decoded video and audio are supplied by the first A/V output interface 34 to, for example, the A/V switcher and an audio mixer as video and audio to be broadcast.

Using the fact that the retention time that is the second error correction-allowed time elapses as a trigger, the second FEC unit 305 performs error correction on the FEC block read from the A/V stream construction buffer 301 and supplies the result to the second decoder 307.

The second decoder 307 decodes the result of the error correction obtained by the second FEC unit 305. The decoded video and audio are output to, for example, the studio monitor and the studio speaker in the studio by the second A/V output interface 34.

The ARQ unit 302 makes a determination regarding packet loss in the FEC block and sends a retransmission request of a lost packet to the data transmission apparatus 10 through the control TX unit 303 in real time. As a determination method for packet loss, there is, for example, a method of making a determination regarding packet loss on the basis of, for example, missing of a sequence number of packets retained in the A/V stream construction buffer 301 if recovering from the packet loss cannot be achieved at the first FEC unit 304. Alternatively, the packet loss may be determined on the basis of, for example, missing of the sequence number of packets retained in the A/V stream construction buffer 301 irrespective of a determination result regarding whether or not the packet loss can be recovered by the first FEC unit 304. The control TX unit 303 performs processing for receiving and sending various requests from/to the control RX unit 104 of the data transmission apparatus 10. The control TX unit 303 sends the packet retransmission request to the data transmission apparatus 10 in real time in accordance with an instruction of the packet retransmission request from the ARQ unit 302.

[System Configuration Example of Spot and Studio]

Figure 5:
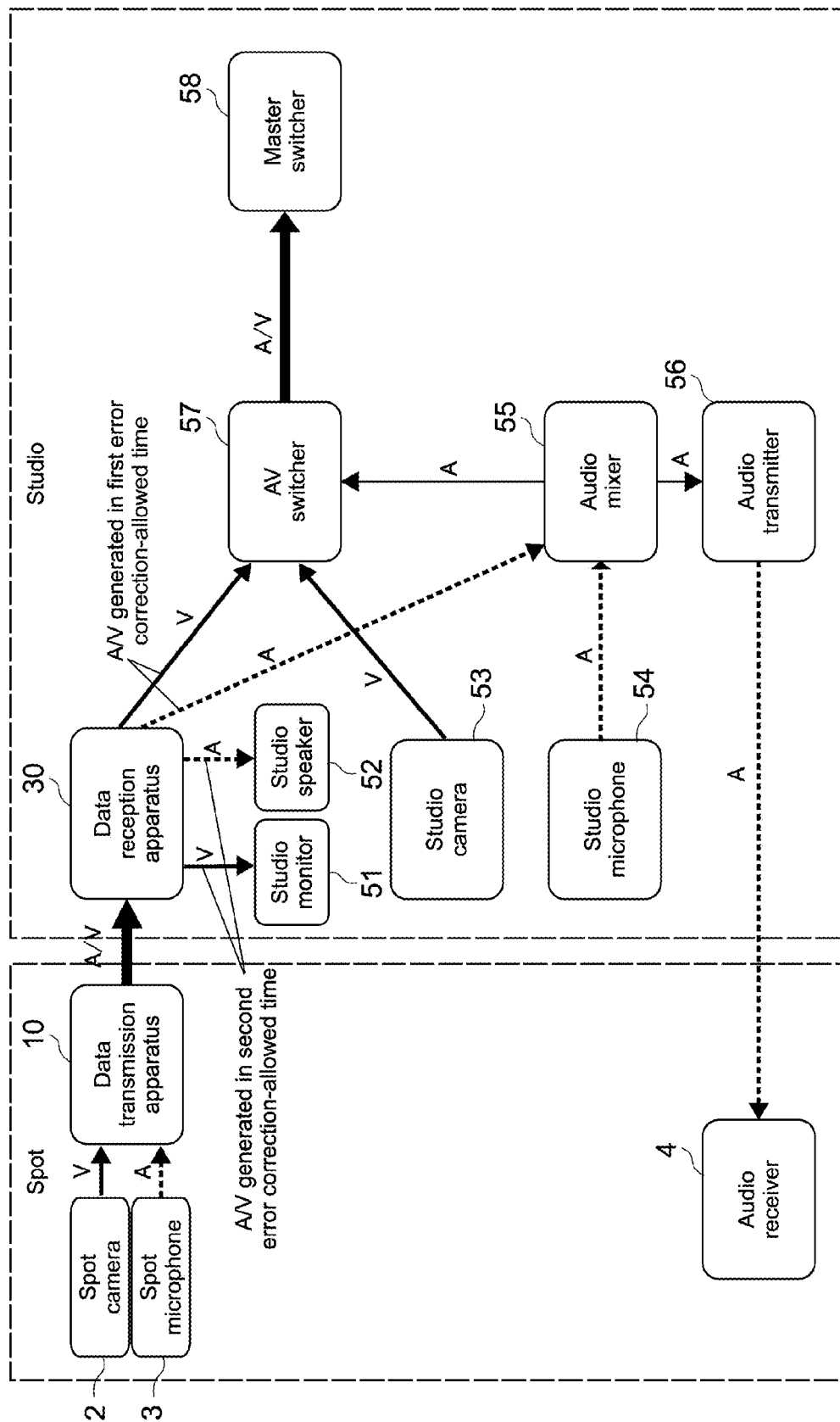
[FIG. 5] A diagram showing an entire system configuration of a spot and a studio employing the data transmission system 1 of FIG. 1.

FIG. 5 is a diagram showing an entire system configuration of the spot and the studio employing the data transmission system 1 of FIG. 1.

In the spot, a spot camera 2, a spot microphone 3, an audio receiver 4, and the above-mentioned data transmission apparatus 10 are present. On the other hand, in the studio, other than the above-mentioned data reception apparatus 30, a studio monitor 51, a studio speaker 52, a studio camera 53, a studio microphone 54, an audio mixer 55, an audio transmitter 56, an A/V switcher 57, a master switcher 58, and the like are present.

The spot camera 2 is a camera that captures spot's video. The spot microphone 3 collects spot's audio. Video and audio obtained by the spot camera 2 and the spot microphone 3 are transmitted to the studio by the data transmission apparatus 10.

The audio receiver 4 is an apparatus that receives audio sent from the audio transmitter 56 of the studio through a fixed radio line and the like.

The studio monitor 51 is a monitor for displaying the spot's video received by the data reception apparatus 30.

The studio speaker 52 is a speaker for emitting the spot's audio received by the data reception apparatus 30.

The studio camera 53 is a camera for capturing the studio's video.

The studio microphone 54 is a microphone for collecting the studio's audio.

The audio mixer 55 synthesizes the spot's audio received by the data reception apparatus 30 with the studio's audio obtained by the studio microphone 54.

The audio transmitter 56 sends the synthesized audio obtained by the audio mixer 55 to the audio receiver 4 of the spot through a fixed radio line and the like.

The A/V switcher 57 is a device that switches video between the spot side and the studio side. The A/V switcher 57 has a function of being capable of inserting, when switching from the video on the spot side to the video on the studio side, a delay time having an arbitrary length into the studio's video and the synthesized audio of the audio mixer 55.

The master switcher 58 is a device for switching an output destination of video and audio selected by the A/V switcher 57. Examples of the output destination include a broadcasting processing unit that performs processing of broadcasting video and audio and a recording device that records video and audio.

[Operation of Data Transmission System 1]

Next, an operation during a talk between the spot and the studio in the entire system of the spot and the studio shown in FIG. 5 will be described.

An operation during a talk in a case where only one error correction-allowed time is set will be first described as a comparison example and an operation during a talk in a case where the first error correction-allowed time and the second error correction-allowed time are set will be described after that.

Figure 6:
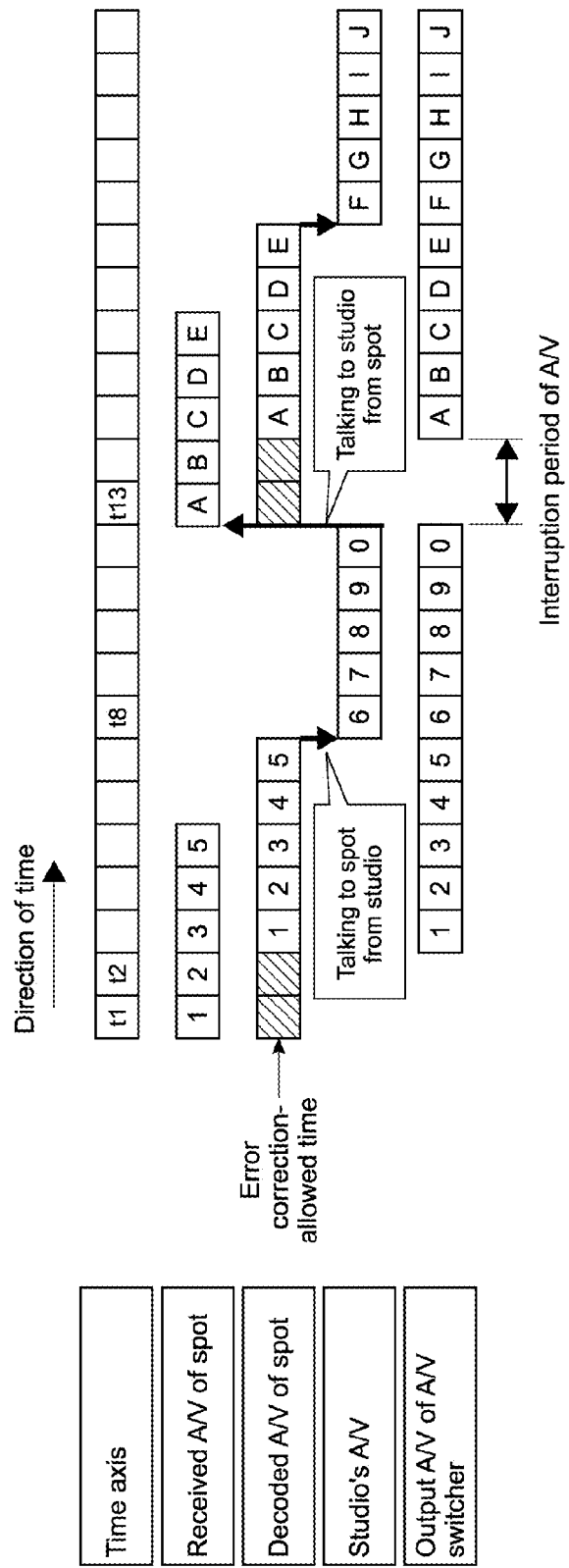
[FIG. 6] A timing chart of an operation during a talk in a case where only one error correction-allowed time is set.

FIG. 6 is a timing chart of the operation during the talk in the case where the only one error correction-allowed time is set. In the figure, each of the rectangles arranged along the time axis indicates a time unit that is one second. It is assumed that the set error correction-allowed time is two seconds.

In the spot, the spot's video is captured by the spot camera 2 and the spot's audio is collected by the spot microphone 3. The spot's video captured by the spot camera 2 and the spot's audio obtained by the spot microphone 3 are sent to the data reception apparatus 30 of the studio from the data transmission apparatus 10 of the spot. When receiving the spot's video and audio, the data reception apparatus 30 of the studio retains the received spot's video and audio in the A/V stream construction buffer 301.

The FEC block is read from the A/V stream construction buffer 301 at a point of time at which the retention time reaches two seconds that are the error correction-allowed time and error correction and decoding are performed. The decoded video is output to the A/V switcher 57 and output to the studio monitor 51. Further, the decoded audio is output to the studio speaker 52 and output to the audio mixer 55. Here, the spot's audio output to the audio mixer 55 is synthesized with the studio's audio and the synthesized audio is output to the A/V switcher 57 and the audio transmitter 56. With this, the studio staff can view and listen to the spot's video and audio through the studio monitor 51 and the studio speaker 52.

When the A/V switcher 57 is controlled to select the spot side, the spot's video selected by the A/V switcher 57 and the synthesized audio obtained by the audio mixer 55 are supplied to the master switcher 58. If the broadcasting processing unit is set as the output destination of the master switcher 58, the spot's video and audio are output to the broadcasting processing unit and the spot's video and audio are broadcast.

In the studio, an announcer or the like who viewed and listened to the spot's video and audio output to the studio monitor 51 and the studio speaker 52 interrogates or calls, for example, a reporter or the like of the spot. At this time, the studio's video captured by the studio camera 53 is output to the A/V switcher 57 and the studio's audio obtained by the studio microphone 54 is synthesized with the spot's audio by the audio mixer 55 and supplied to the A/V switcher 57 and the audio transmitter 56.

It is assumed that the A/V switcher 57 performs switching to the studio side at the timing t8 on the time axis. With this, instead of the spot's video, the studio's video and the synthesized audio obtained by the audio mixer 55 are output to the master switcher 58 by the A/V switcher 57 and output to the broadcasting processing unit by the master switcher 58. With this, the studio's video and the synthesized audio are broadcast.

Further, the synthesized audio obtained by the audio mixer 55 is sent to the audio receiver 4 of the spot by the audio transmitter 56 as required.

It is assumed that, after that, the A/V switcher 57 performs switching to the spot side again at the timing t13 on the time axis. At this time, although the video and audio from the spot have already been received by the data reception apparatus 30, they are output to the A/V switcher 57 and the audio mixer 55, delayed by two seconds that are the error correction-allowed time. Therefore, the video and audio are consequently interrupted for two seconds immediately after switching. To reduce this delay time (error correction-allowed time) for reducing the interruption time lowers the packet loss recovery rate and the quality of the broadcast video and audio is deteriorated.

Figure 7:
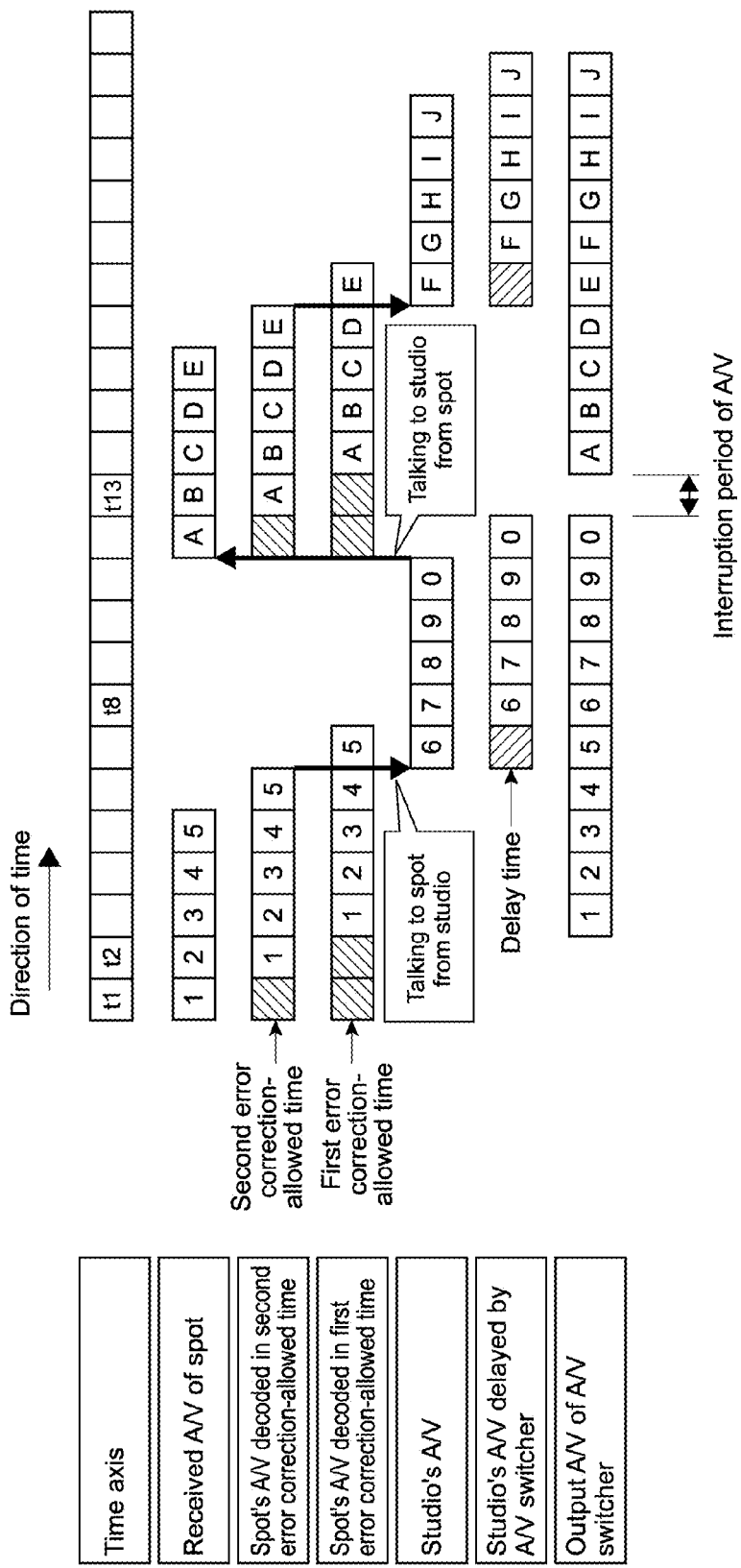
[FIG. 7] A timing chart of an operation during a talk in a case where a first error correction-allowed time and a second error correction-allowed time are set.

Next, the operation during the talk in the case where the first error correction-allowed time and the second error correction-allowed time are set will be described with reference to FIG. 7.

Here, it is assumed that the first error correction-allowed time is set to two seconds and the second error correction-allowed time is set to one second.

In the spot, the spot's video is captured by the spot camera 2 and the spot's audio is collected by the spot microphone 3. The spot's video captured by the spot camera 2 and the spot's audio obtained by the spot microphone 3 are sent to the data reception apparatus 30 of the studio from the data transmission apparatus 10 of the spot. When receiving the spot's video and audio, the data reception apparatus 30 of the studio retains the received spot's video and audio in the A/V stream construction buffer 301.

At a point of time (second point of time) at which the retention time reaches the second error correction-allowed time (one second), the FEC block is read from the A/V stream construction buffer 301 and error correction and decoding are performed. The decoded video is output to the studio monitor 51 and the decoded audio is output to the studio speaker 52. With this, the studio staff can view and listen to the spot's video and audio through the studio monitor 51 and the studio speaker 52.

Further, at a point of time (first point of time) at which the retention time reaches the first error correction-allowed time (two seconds), the FEC block is read from the A/V stream construction buffer 301 and error correction and decoding are performed. The decoded video is output to the A/V switcher 57 and the decoded audio is output to the audio mixer 55. Here, the spot's audio output to the audio mixer 55 is synthesized with the studio's audio and the synthesized audio is output to the A/V switcher 57 and the audio transmitter 56.

When the A/V switcher 57 is controlled to select the spot side, the spot's video selected by the A/V switcher 57 and the synthesized audio obtained by the audio mixer 55 are supplied to the master switcher 58. If the broadcasting processing unit is set as the output destination of the master switcher 58, the spot's video and audio are output to the broadcasting processing unit and the spot's video and audio are broadcast.

In the studio, an announcer or the like who viewed and listened to the spot's video and audio output to the studio monitor 51 and the studio speaker 52 interrogates or calls, for example, a reporter or the like of the spot. At this time, the studio's video captured by the studio camera 53 is output to the A/V switcher 57 and the studio's audio obtained by the studio microphone 54 is synthesized with the spot's audio by the audio mixer 55 and output to the A/V switcher 57 and the audio transmitter 56.

It is assumed that the A/V switcher 57 performs switching to the studio side at the timing t8 on the time axis. With this, instead of the spot's video, the studio's video and the synthesized audio obtained by the audio mixer 55 are output to the master switcher 58 by the A/V switcher 57 and output to the broadcasting processing unit by the master switcher 58 to thereby be broadcast.

By the way, the delay time of the spot's video and audio is two seconds that are the first error correction-allowed time and talking from the studio side is performed corresponding to the video and audio for one second that is the second error correction-allowed time. That is, the studio's video and audio is one preceding the spot's video and audio by one second. Therefore, if the output of the A/V switcher 57 is simply switched to the studio side from the spot side, first one second of the video and audio on the studio side is missed. In order to compensate for this point, the A/V switcher 57 is provided with at least a delay circuit (buffer memory) having a delay amount that is a difference between the first error correction-allowed time (two seconds) and the second error correction-allowed time (one second). The A/V switcher 57 uses this delay circuit for delaying the video on the studio side and the synthesized audio obtained by the audio mixer 55 and outputs them to the master switcher 58. With this, the continuity of the video and audio, which includes switching to the studio side from the spot side, can be ensured.

After that, it is assumed that the A/V switcher 57 performs switching to the spot side again at the timing t13. Although, at this time, the video and audio from the spot are output to the A/V switcher 57 and the audio mixer 55, delayed by two seconds that are the first error correction-allowed time, the talk from the spot to the studio is performed listening to the studio's audio arriving at the spot, which precedes the broadcasting by one second. Thus, video and audio are merely interrupted by one second on the broadcasting.

That is the operation of the data transmission system 1 of this embodiment during the talk.

As described above, in accordance with the data transmission system 1 of this embodiment, the use of the two types of error correction-allowed times received from the spot can provide the high-quality video and audio to be broadcast and the video and audio for the studio with the reduced delay time. With this, for example, during a talk between the spot and the studio, it is possible to reduce the time in which the video and audio to be broadcast are interrupted. Further, the degree of freedom of setting of the first error correction-allowed time in generating the video and audio to be broadcast becomes higher, and hence it is possible to broadcast high-quality video and audio.

[GUI for Management]

As shown in FIG. 1, an application program for control is installed into the control device 40 that manages a connection between the data transmission apparatus 10 and the data reception apparatus 30. The CPU 42 (second controller) of the control device 40 causes a monitor 41, which is connected to the control device 40, to display a graphical user interface (GUI) for control on the basis of the application program for control.

Figure 8:
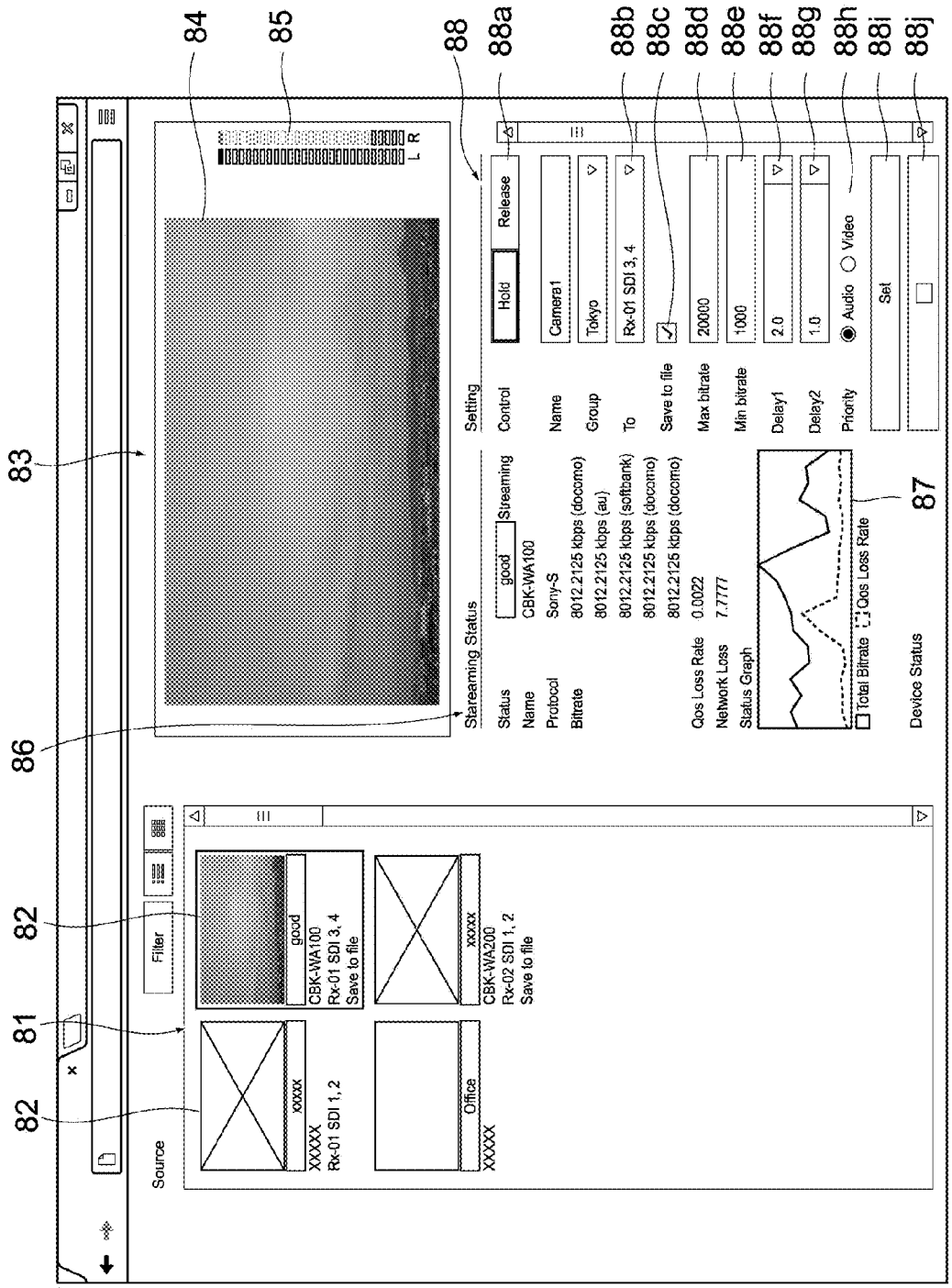
[FIG. 8] A diagram showing a GUI for management for each connection.

FIG. 8 is a diagram showing the GUI for management for each connection.

In this GUI, a thumbnail display area 81 is provided in a left region. Thumbnails 82 of respective connections are displayed in the thumbnail display area 81. The thumbnails 82 are created from video or the like to be broadcast which has been decoded by the data reception apparatus 30. A management area 83 regarding a connection corresponding to the thumbnail 82 selected by a user in the thumbnail display area 81 is provided in a right region.

In the management area 83, a preview 84 of the video to be broadcast which has been decoded at the data reception apparatus 30 and a gauge 85 with which it can be checked whether audio is being transmitted.

Further, in the management area 83, there is provided a status display area 86 from which status of stream transmission to the data reception apparatus 30 from the data transmission apparatus 10 can be checked. A graph 87 showing an error rate (packet loss rate) and a communication rate on a single time axis is displayed in the status display area 86.

In addition, the management area 83 has a setting area 88 for setting a communication condition of the connection. In the setting area 88, there are provided a control start button 88a for instructing start of control of the data reception apparatus 30, an output port setting unit 88b for setting an A/V output port of the data reception apparatus 30, a filing setting unit 88c for setting whether to save an A/V stream as a file, a maximum bitrate setting unit 88d that sets a maximum bitrate of stream transmission, a minimum bitrate setting unit 88e that sets a minimum bitrate, a first delay time setting unit 88f for setting the first error correction-allowed time, a second delay time setting unit 88g for setting the second error correction-allowed time, a priority transmission setting unit 88h for selecting either of video and audio to preferentially transmit, a setting determination button 88i for instructing reflection of the setting contents above, a streaming start button 88j for instructing start of stream transmission, and the like. The various setting units above are constituted of, for example, a pull-down menu.

One example of operations performed using this GUI will be described.

The user monitors the error rate (packet loss rate) displayed in the status display area 86 and the graph 87 of a communication bitrate. For example, when the error rate becomes higher or the communication bitrate becomes lower, the user changes the first error correction-allowed time into a longer time, using the first delay time setting unit 88f of the setting area 88.

Further, if the error rate significantly increases or the communication bitrate significantly decreases at this time, it can be expected that the video and audio on the studio side will be also significantly deteriorated. Thus, in addition to changing the first error correction-allowed time, it may be changed into a time longer than the second error correction-allowed time, using the second delay time setting unit 88g.

Figure 9:
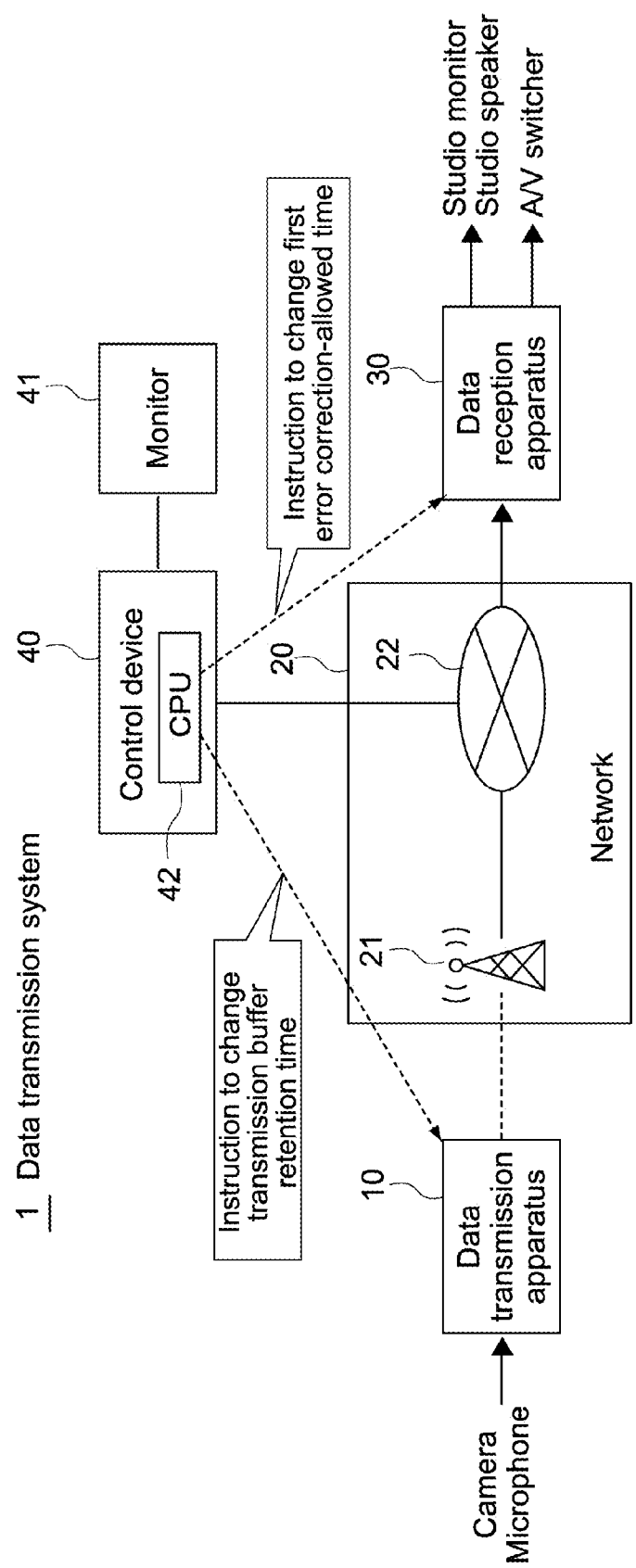
[FIG. 9] A diagram for describing a method of changing the error correction-allowed time.

When the setting determination button 88i is operated, the CPU 42 of the control device 40 sends an instruction for changing the first error correction-allowed time to the reception apparatus 30 as shown in FIG. 9. The CPU 31 of the reception apparatus 30 changes the first error correction-allowed time in real time in accordance with this instruction from the control device 40. Further, the CPU 42 of the control device 40 sends an instruction for causing the retention time of the FEC block in the transmission buffer 103 of the transmission apparatus 10 to correspond to the changed first error correction-allowed time to the transmission apparatus 10. The CPU 11 of the transmission apparatus 10 causes the retention time of the FEC block in the transmission buffer 103 to correspond to the changed first error correction-allowed time in accordance with this instruction from the control device 40.

MODIFIED EXAMPLE 1

The data transmission system according to the present technology can be utilized not only in the case of talking between the spot and the studio but also in a case of recording the spot's video and audio in a recording device such as a server while a staff of a broadcast station is monitoring them.

Figure 10:
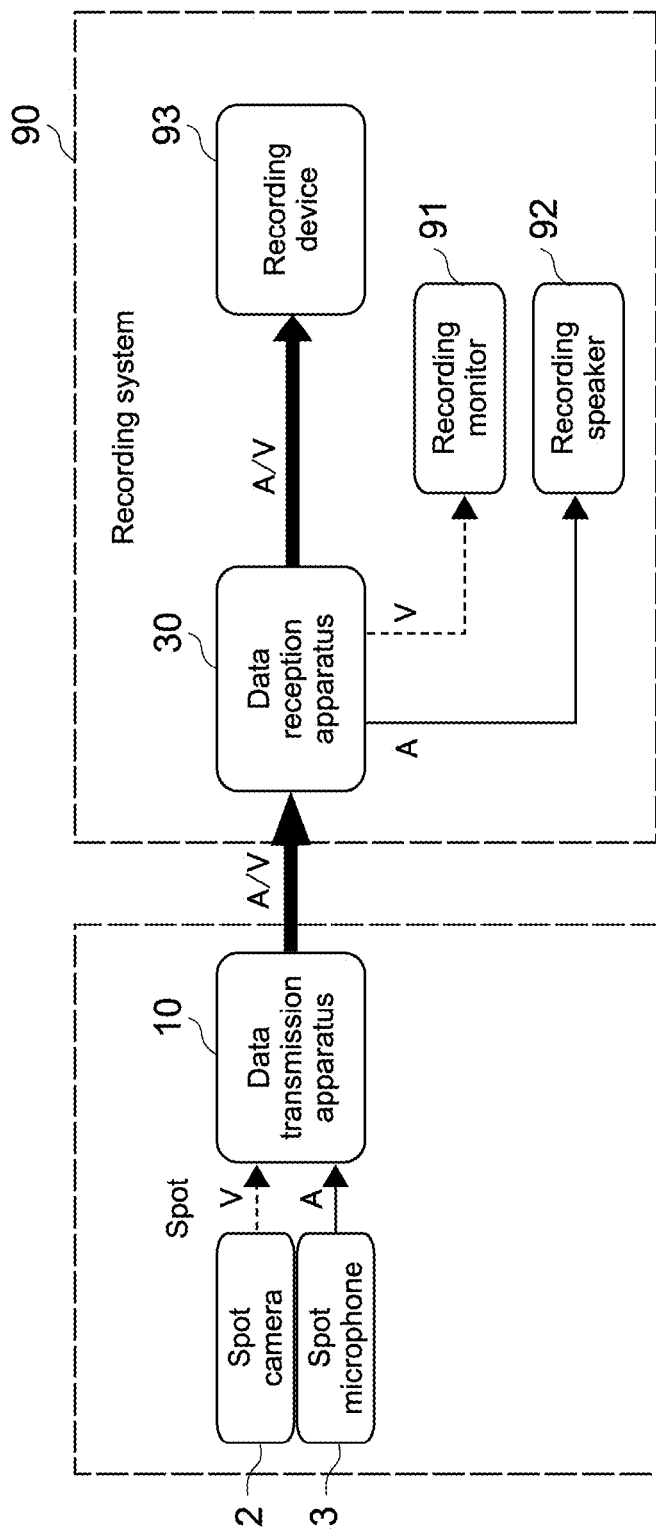
[FIG. 10] A diagram showing a configuration of a recording system of Modified Example 1 according to the present technology.

FIG. 10 is a diagram showing a configuration of a recording system of the broadcast station.

This recording system 90 mainly includes the data reception apparatus 30, a recording monitor 91, a recording speaker 92, and a recording device 93.

In the data reception apparatus 30, the spot's video and audio generated using a first error correction-allowed time are output to the recording device 93 by the first A/V output interface 34.

Further, in the data reception apparatus 30, the spot's video and audio generated using a second error correction-allowed time are output to the recording monitor 91 and the recording speaker 92 by the second A/V output interface 35. The recording staff views the spot's video displayed on the recording monitor 91 and the spot's audio output from the recording speaker 92 and appropriately gives instructions of recording start and recording end of the spot's video and audio to the recording device 93.

The recording device 93 records data of the spot's video and audio for a period from the recording start to the recording end instructed by the recording staff.

The spot's video and audio output to the recording monitor 91 and the recording speaker 92 precedes the video and audio output to the recording device 93 by a time difference between the first error correction-allowed time and the second error correction-allowed time. Therefore, it is possible to instruct the recording device 93 about a period of a scene to be recorded, having a sufficient margin. Therefore, it is possible to fully record the video and audio of the scene wished to be recorded without waste.

Note that, for applying the data transmission system 1 of the first embodiment in such a recording system of the broadcast station, the first error correction-allowed time considering the QoS as important may be set to a sufficiently long time, for example, 10 seconds.

MODIFIED EXAMPLE 2

In the first embodiment, the user can manually set the first error correction-allowed time using the management GUI. However, the first error correction-allowed time may be adaptively controlled in accordance with the error rate, the transmission delay, and the like during communication.

To be specific, as shown in FIG. 9, the CPU 42 (second controller) of the control device 40 monitors at least either one of an error rate and a transmission delay during communication in accordance with the application program for control and sends an instruction for changing the first error correction-allowed time to the reception apparatus 30 in real time in accordance with a detected result. The CPU 31 of the reception apparatus 30 changes the first error correction-allowed time in real time in accordance with this instruction from the control device 40. Here, the first error correction-allowed time may be set to be variable in two or more steps.

Further, along with the change in the first error correction-allowed time, the CPU 42 of the control device 40 sends an instruction for causing the retention time of the FEC block in the transmission buffer 103 of the transmission apparatus 10 to correspond to the first error correction-allowed time, to the transmission apparatus 10. The CPU 11 of the transmission apparatus 10 causes the retention time of the FEC block in the transmission buffer 103 to correspond to the changed first error correction-allowed time in accordance with this instruction from the control device 40.

By thus changing the first error correction-allowed time into the longer time in real time during communication, an opportunity where video and audio that has failed once due to an error can be repaired by recovering a lost packet can be obtained.

MODIFIED EXAMPLE 3

Regarding the management GUI, the following modified example can be present.

The CPU 42 of the control device 40 collects information on memory capacity and the like that can be allocated to the buffer from the data transmission apparatus 10 and the data reception apparatus 30 between which a connection is established. On the basis of the collected information of the respective apparatuses, the CPU 42 limits an upper limit value of the first error correction-allowed time that can be set in the first delay time setting unit 88f of the management GUI. If the user tries to set a value above the upper limit value as the setting value of the first error correction-allowed time, the CPU 42 of the control device 40 rejects the setting and automatically replaces this setting value by the upper limit value. With this, setting of an inappropriate first error correction-allowed time can be prevented.

MODIFIED EXAMPLE 4

In the above-mentioned embodiment, the two error correction-allowed times that are the first error correction-allowed time and the second error correction-allowed time are set. However, three or more error correction-allowed times different from one another are set and an error correction result on an FEC block at each point of time at which each error correction-allowed time elapses may be output.

It should be noted that the present technology may also take the following configurations.

(1) A data reception apparatus, including:
a first buffer capable of retaining a received packet at least in units of error correction blocks; and
a first controller that
requests a transmission source to retransmit a lost packet in the error correction block retained in the first buffer and performs processing of recovering the lost packet, and
reads, from the first buffer, the error correction block at each point of time at which each of a plurality of particular data correction-allowed times different from each other elapses, performs error correction on each error correction block read at each point of time, and outputs each error correction result.

(2) The data reception apparatus according to (1), in which
each point of time at which each of the plurality of particular data correction-allowed times different from each other elapses is a first point of time at which a particular first data correction-allowed time elapses and a second point of time at which a particular second data correction-allowed time shorter than the first data correction-allowed time elapses, and
the first controller is configured to output an error correction result with respect to the error correction block read at the first point of time as first error correction data and output an error correction result with respect to the error correction block read at the second point of time as second error correction data.

(3) The data reception apparatus according to (2), in which
the packet includes video and audio data,
the data reception apparatus further including:
a first output interface for outputting the first error correction data as data to be broadcast; and
a second output interface for outputting the second error correction data to a studio monitor and a studio speaker of a broadcast station.

(4) The data reception apparatus according to any of (1) to (3), in which
the first controller is configured to dynamically change, during reception of a stream, the first data correction-allowed time on the basis of a command from an external control device.

(5) The data reception apparatus according to (2), in which
the packet includes video and audio data,
the data reception apparatus further including:
a first output interface for outputting the first error correction data to a recording device of a broadcast station; and
a second output interface for outputting the second error correction data to a recording monitor and a recording speaker of the broadcast station.

(6) A data transmission system, including:
a data reception apparatus including
a first buffer capable of retaining a received packet at least in units of error correction blocks, and
a first controller that
requests a transmission apparatus to retransmit a lost packet in the error correction block retained in the first buffer and performs processing of recovering the lost packet, and
reads, from the first buffer, the error correction block at a point of time at which each of a plurality of particular data correction-allowed times different from each other elapses, performs error correction on each error correction block read at each point of time, and outputs each error correction result;
a data transmission apparatus including a second buffer capable of retaining a packet to send, at least in units of error correction blocks; and
a control device including a second controller that sets a longest data correction-allowed time of the plurality of data correction-allowed times and sets a retention time in which the error correction block is retained by the second buffer to the longest data correction-allowed time.

(7) The data transmission system according to (6), in which
the second controller is configured to control the longest data correction-allowed time on the basis of at least either one of an error rate and a transmission delay.

(8) The data transmission system according to (6) or (7), in which
the control device further includes a user interface that receives input from a user for setting the longest data correction-allowed time.

(9) The data transmission system according to (8), in which
the user interface receives input from a user for setting the longest data correction-allowed time to another data correction-allowed time.

REFERENCE SIGNS LIST

1 . . . data transmission system
10 . . . transmission apparatus
20 . . . network
30 . . . reception apparatus
31 . . . CPU
34 . . . first A/V output interface
35 . . . second A/V output interface
40 . . . control device
41 . . . monitor
42 . . . CPU
51 . . . studio monitor
52 . . . studio speaker
88f . . . first delay time setting unit
88g . . . second delay time setting unit
90 . . . recording system
91 . . . recording monitor
92 . . . recording speaker
93 . . . recording device
101 . . . encoder
102 . . . FEC unit
103 . . . transmission buffer
105 . . . ARQ unit
301 . . . A/V stream construction buffer
302 . . . ARQ unit
304 . . . first FEC unit
305 . . . second FEC unit
306 . . . first decoder
307 . . . second decoder

The invention claimed is:

1. A data reception apparatus, comprising:
a first buffer capable of retaining a received packet at least in units of error correction blocks; and
a first controller that
requests a transmission source to retransmit a lost packet in the error correction block retained in the first buffer and performs processing of recovering the lost packet, and
reads, from the first buffer, the error correction block at each point of time at which each of a plurality of particular data correction-allowed times different from each other elapses, performs error correction on each error correction block read at each point of time, and outputs each error correction result.

2. The data reception apparatus according to claim 1, wherein
each point of time at which each of the plurality of particular data correction-allowed times different from each other elapses is a first point of time at which a particular first data correction-allowed time elapses and a second point of time at which a particular second data correction-allowed time shorter than the first data correction-allowed time elapses, and
the first controller is configured to output an error correction result with respect to the error correction block read at the first point of time as first error correction data and output an error correction result with respect to the error correction block read at the second point of time as second error correction data.

3. The data reception apparatus according to claim 2, wherein
the packet includes video and audio data,
the data reception apparatus further comprising:
a first output interface for outputting the first error correction data as data to be broadcast; and
a second output interface for outputting the second error correction data to a studio monitor and a studio speaker of a broadcast station.

4. The data reception apparatus according to claim 3, wherein
the first controller is configured to dynamically change, during reception of a stream, the first data correction-allowed time on the basis of a command from an external control device.

5. The data reception apparatus according to claim 2, wherein
the packet includes video and audio data,
the data reception apparatus further comprising:
a first output interface for outputting the first error correction data to a recording device of a broadcast station; and
a second output interface for outputting the second error correction data to a recording monitor and a recording speaker of the broadcast station.

6. A data transmission system, comprising:
a data reception apparatus including
a first buffer capable of retaining a received packet at least in units of error correction blocks, and
a first controller that
requests a transmission apparatus to retransmit a lost packet in the error correction block retained in the first buffer and performs processing of recovering the lost packet, and
reads, from the first buffer, the error correction block at a point of time at which each of a plurality of particular data correction-allowed times different from each other elapses, performs error correction on each error correction block read at each point of time, and outputs each error correction result;
a data transmission apparatus including a second buffer capable of retaining a packet to send, at least in units of error correction blocks; and
a control device including a second controller that sets a longest data correction-allowed time of the plurality of data correction-allowed times and sets a retention time in which the error correction block is retained by the second buffer to the longest data correction-allowed time.

7. The data transmission system according to claim 6, wherein
the second controller is configured to control the longest data correction-allowed time on the basis of at least either one of an error rate and a transmission delay.

8. The data transmission system according to claim 7, wherein
the control device further includes a user interface that receives input from a user for setting the longest data correction-allowed time.

9. The data transmission system according to claim 8, wherein
the user interface receives input from a user for setting the longest data correction-allowed time to another data correction-allowed time.

10. A data reception method, comprising:
by a first controller
requesting a transmission apparatus to retransmit a lost packet in an error correction block retained in a first buffer and performing processing of recovering the lost packet, the first buffer being capable of retaining a received packet at least in units of error correction blocks;

reading, from the first buffer, the error correction block at a point of time at which each of a plurality of particular data correction-allowed times different from each other elapses; and performing error correction on each error correction block read at each point of time and outputting each error correction result.

11. A data transmission method, comprising:

by a second controller of a control device setting a longest data correction-allowed time of a plurality of particular data correction-allowed times different from each other in a data reception apparatus that requests a transmission apparatus to retransmit a lost packet in an error correction block retained in a first buffer capable of retaining a received packet at least in units of error correction blocks and performs processing of recovering the lost packet, and reads, from the first buffer, the error correction block at a point of time at which each of the plurality of data correction-allowed times different from each other elapses, performs error correction on each error correction block read at each point of time, and outputs each error correction result; and setting, to the longest data correction-allowed time, a retention time of the error correction block in which the error correction block is retained by a second buffer of a data transmission apparatus whose connection with the data reception apparatus is established, the second buffer retaining a transmission packet.

* * * * *